US009537299B2

(12) United States Patent
Rozman et al.

(10) Patent No.: US 9,537,299 B2
(45) Date of Patent: Jan. 3, 2017

(54) POWER MANAGEMENT AND DISTRIBUTION WITH AUXILIARY DC BUS

(75) Inventors: Gregory I. Rozman, Rockford, IL (US); Steven J. Moss, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 873 days.

(21) Appl. No.: 13/557,783

(22) Filed: Jul. 25, 2012

(65) Prior Publication Data

US 2014/0028094 A1    Jan. 30, 2014

(51) Int. Cl.
| H02J 1/00 | (2006.01) |
| G05F 3/08 | (2006.01) |
| H01H 83/00 | (2006.01) |
| H02H 3/02 | (2006.01) |
| H02J 1/10 | (2006.01) |
| H02H 3/08 | (2006.01) |

(52) U.S. Cl.
CPC ............. *H02H 3/025* (2013.01); *H02H 3/08* (2013.01); *H02J 1/10* (2013.01); *Y10T 307/406* (2015.04); *Y10T 307/76* (2015.04)

(58) Field of Classification Search
CPC ............. H02J 1/10; H02H 3/08; H02H 3/025
USPC ................... 307/31, 115; 323/311
See application file for complete search history.

(56) References Cited

U.S. PATENT DOCUMENTS

| 4,812,672 A * | 3/1989 | Cowan | H02J 9/061 |
| | | | 307/43 |
| 7,564,147 B2 | 7/2009 | Michalko | |
| 8,716,997 B2 * | 5/2014 | Rao | H02H 9/001 |
| | | | 323/266 |
| 2010/0066165 A1 | 3/2010 | Ganev | |
| 2011/0309809 A1 * | 12/2011 | Rao | H03K 17/167 |
| | | | 323/282 |
| 2013/0278193 A1 * | 10/2013 | Rozman | H02J 1/00 |
| | | | 318/400.26 |

FOREIGN PATENT DOCUMENTS

EP    2398146 A2    12/2011

OTHER PUBLICATIONS

Andrei Blinov et al: "Energy-Efficient High-Voltage Switch Based on Parallel Connection of IGBT and IGCT", Compatibility and Power Electronics (CPE), IEEE, Jun. 1, 2011, pp. 360-364.
Braun C G Ed—Institute of Electrical and Electronics Engineers: "Hybrid Power Switch Concept", IEEE, Jul. 3, 1995, p. 1488.

(Continued)

*Primary Examiner* — Rexford Barnie
*Assistant Examiner* — Elim Ortiz
(74) *Attorney, Agent, or Firm* — Kinney & Lange, P.A.

(57) ABSTRACT

A power management and distribution (PMAD) system includes a main DC bus, an auxiliary DC bus, a power converter, one or more hybrid solid-state circuit breakers, and a controller. The power converter converts power from the main DC bus to provide a regulated output to the auxiliary bus. Each hybrid SSCB includes a main switch connected between the main DC bus and a load and an auxiliary switch connected between the auxiliary DC bus and the load. The controller selectively turns the main switch and the auxiliary switch On/Off to selectively supply power from the main DC bus and/or the auxiliary DC bus to the load, and to selectively regulate the voltage on the auxiliary DC bus.

15 Claims, 7 Drawing Sheets

(56) References Cited

OTHER PUBLICATIONS

Tennakoon S B et al.: "Short-Circuit Interruption Performance of Thyristor Circuit Breakers", Feb. 13, 1994, pp. 832-838.
European Search Report dated Feb. 7, 2014, for U.S. Appl. No. 13/760,670.

* cited by examiner

POWER MANAGEMENT AND
DISTRIBUTION WITH AUXILIARY DC BUS

BACKGROUND

The present invention is related to power management and distribution (PMAD) systems and in particular to PMAD systems employing hybrid solid-state circuit breaker (SSCB) circuits.

Power management and distribution (PMAD) systems control the supply of DC and/or AC power to various loads. Circuit breakers and switches are commonly employed by these systems to not only control the supply of power to the various loads but also to protect the load from fault conditions. More recently, solid-state circuit breakers (SSCBs) have been employed to provide fast response time, eliminate arcing during turn-off, and prevent bouncing during turn-on transients. For example, power semiconductor devices such as metal-oxide semiconductor field effect transistors (MOSFETs) or insulated gate bipolar transistors (IGBT) are commonly employed by SSCBs to control the distribution of power to a load. In particular, power MOSFETs are commonly employed due to their low conduction losses when conducting. The SSCB is part of a solid-state power controller (SSPC) that includes a controller, current and voltage sensors to monitor the current and voltage, respectively, provided to the load by a power semiconductor device and emulates traditional circuit breaker functionality by turning the power semiconductor device Off to protect the associated load from fault conditions. Thermal sensors may also be employed to protect the SSCB.

One of the specifics of SSCB is high overload requirements that may exceed 1000% of the rated current. To achieve this high current rating, a large number of MOSFET devices are connected in parallel. MOSFETS can be easily paralleled, because of the positive thermal coefficient of their on-state resistance. However, during overload transient conditions the MOSFETs within SSCB may be subject to a current imbalance that results in a particular device exceeding its peak current or continuous thermal ratings. This condition creates reliability concerns. Unbalance may be caused by parameter mismatches between semiconductor devices, gate drive parameter mismatches, and/or power circuit parameter mismatches. There is a need to improve SSCB and PMAD architecture to meet high overload transient requirements without over sizing the SSCB.

SUMMARY

A power management and distribution (PMAD) system includes a main DC bus, an auxiliary DC bus, a power converter, one or more hybrid solid-state circuit breakers, and a controller. The power converter converts power from the main DC bus to provide a regulated output to the auxiliary bus. Each hybrid SSCB includes a main switch connected between the main DC bus and a load and an auxiliary switch connected between the auxiliary DC bus and the load. The controller selectively turns the main switch and the auxiliary switch On/Off to selectively supply power from the main DC bus and/or the auxiliary DC bus to the load, and to selectively regulate the voltage on the auxiliary DC bus.

DETAILED DESCRIPTION

Figure 1:
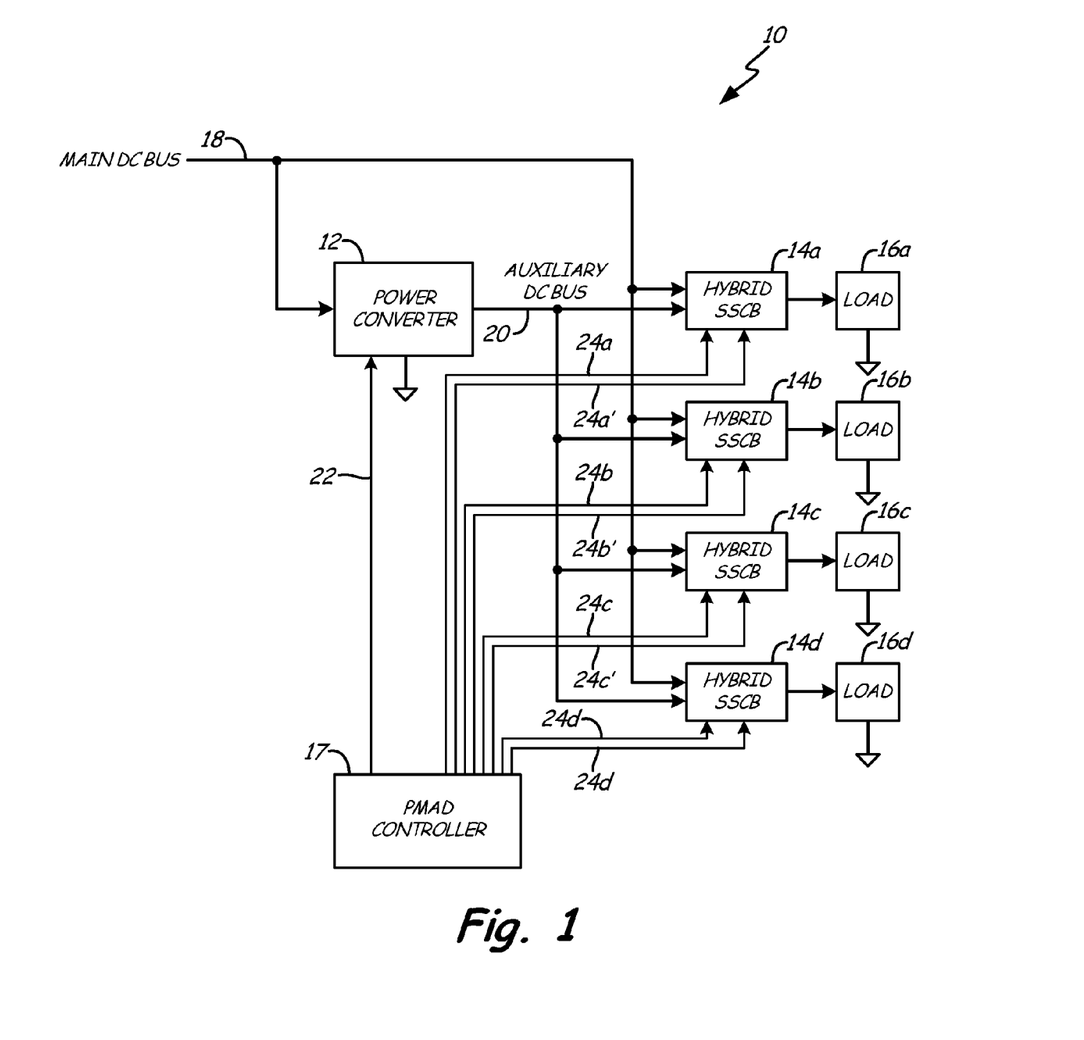
FIG. 1 is a block diagram of a direct current (DC) power management distribution (PMAD) system according to an embodiment of the present invention.

FIG. 1 is a block diagram of direct current (DC) power management and distribution (PMAD) system 10 according to an embodiment of the present invention. Power distribution system 10 includes power converter 12, hybrid solid-state circuit breakers (SSCB) 14a, 14b, 14c, and 14d, loads 16a, 16b, 16c, and 16d, and PMAD controller 17. Hybrid SSCB 14a, 14b, 14c, and 14d are selectively connected to distribute power to loads 16a, 16b, 16c, and 16d, respectively. Each hybrid SSCB 14a, 14b, 14c, and 14d is connected to receive power from main DC bus 18 and auxiliary DC bus 20. In the embodiment shown in FIG. 1, auxiliary DC bus 20 is provided by power converter 12, which receives power from main DC bus 18.

PMAD controller 17 generates control signals to control the operation of power converter 12, and each of the plurality of hybrid SSCBs 14a, 14b, 14c, and 14d. Control signal 22 is provided to power converter 12 to enable and regulate the DC power supplied to auxiliary DC bus 20. Control signals 24a, 24a' are provided to hybrid SSCB 14a to control the supply of power from main DC bus 18 and auxiliary DC bus 20 to load 16a. In particular, control signal 24a is a main gate control signal that controls the distribution of power from main DC bus 18 to load 16a and control signal 24a' is an auxiliary gate control signal that controls the distribution of power from auxiliary DC bus 20. Likewise, control signals 24b, 24b', 24c, 24c', and 24d, 24d' are provided to hybrid SSCBs 14b, 14c, and 14d, respectively, to selectively control the supply of power from main DC bus 18 and auxiliary DC bus 20 to loads 16b, 16c, and 16d, respectively.

Figure 2:
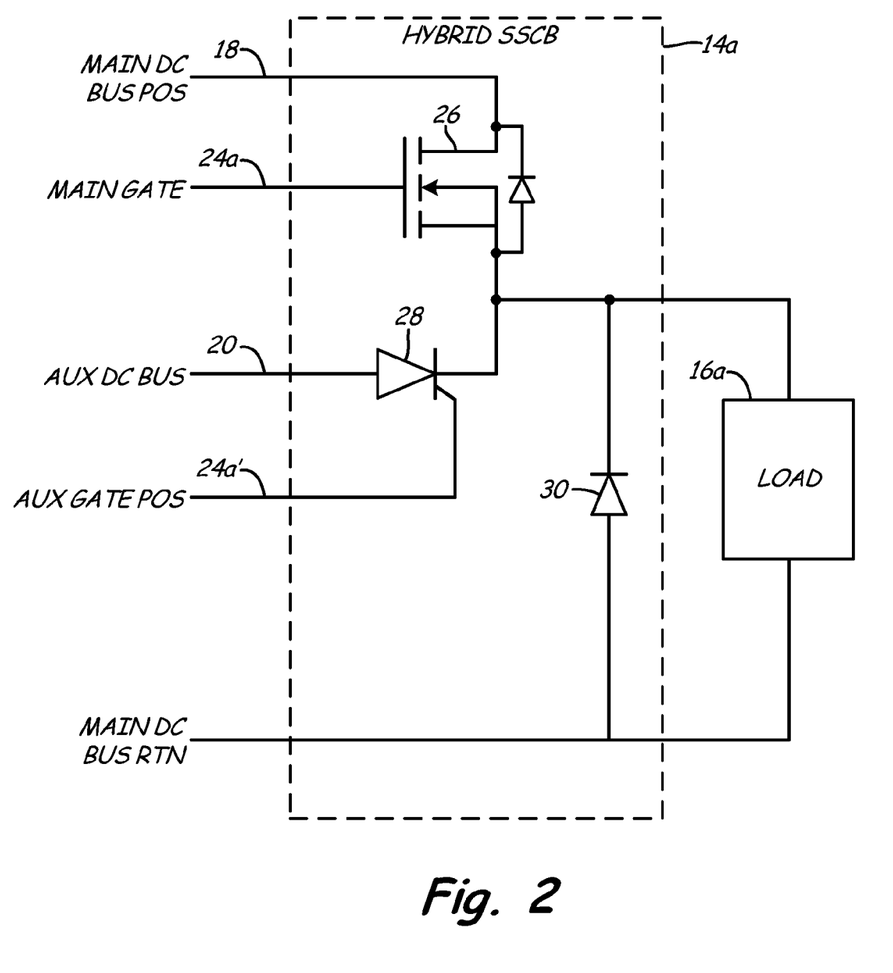
FIG. 2 is a circuit diagram of a DC hybrid solid-state circuit breaker (SSCB) according to an embodiment of the present invention.

FIG. 2 is a circuit diagram of DC hybrid solid-state circuit breaker (SSCB) 14a according to an embodiment of the present invention. Hybrid SSCB 14a includes main switch device 26, auxiliary switch device 28, and diode 30. In the embodiment shown in FIG. 2, main switch 26 is a power metal-oxide semiconductor field-effect transistor (MOSFET) device, although in other embodiments other well-known solid-state switch devices (SSSDs) may be employed. Main switch 26 is connected between main DC bus 18 and load 16a and is selectively turned On and Off via main gate signal 24a supplied by PMAD controller 17. When main switch 26 is On (i.e., "conductive"), then power from main DC bus 18 is supplied via main switch 26 to load 16a. When main switch 26 is Off (i.e., "non-conductive"), then power from main DC bus 18 is prevented from being supplied via switch 26 to load 16a. In the embodiment shown in FIG. 2, a single main switch device 26 is illustrated, although in other embodiments a plurality of switching devices may be connected in parallel to satisfy desired power loss requirements.

In the embodiment shown in FIG. 2, auxiliary switch device 28 is a thyristor (SCR), although in other embodiments other well-known SSSDs may be employed. Diode 30 is connected between the positive output provided to a load and a return line. In the embodiment shown in FIG. 2 auxiliary switch device 28 is a thyristor, selected for its high current rating as composed with MOSFET devices. Auxiliary switch 28 is connected between auxiliary DC bus 20 and load 16a and is selectively turned On and Off via auxiliary gate control signal 24a'. When auxiliary switch 28 is On (i.e., "conductive"), power from auxiliary DC bus 20 is supplied to load 16a. When auxiliary switch 28 is Off (i.e., "non-conductive"), then power from auxiliary DC bus 20 is prevented from being supplied via auxiliary switch 28 to load 16a.

In general, during normal operation the gates of main switch 26 and auxiliary switch 28 are On. However, the voltage provided by main DC bus 18 is typically higher than the voltage supplied by auxiliary DC bus 20, and therefore the auxiliary SCR device is reversed bias, and power supplied to load 16a is provided by main DC bus 18 via main switch 26. Auxiliary DC bus 20 is utilized to implement various modes of operation that require regulation of the input power supplied to one or more loads. For example, PMAD controller 17 regulates auxiliary DC bus 20 during a pre-charge mode, overload protection mode, or current limiting mode. PMAD controller 17 regulates the power supplied to auxiliary DC bus 20 via power converter 12 (shown in FIG. 1).

Figure 3:
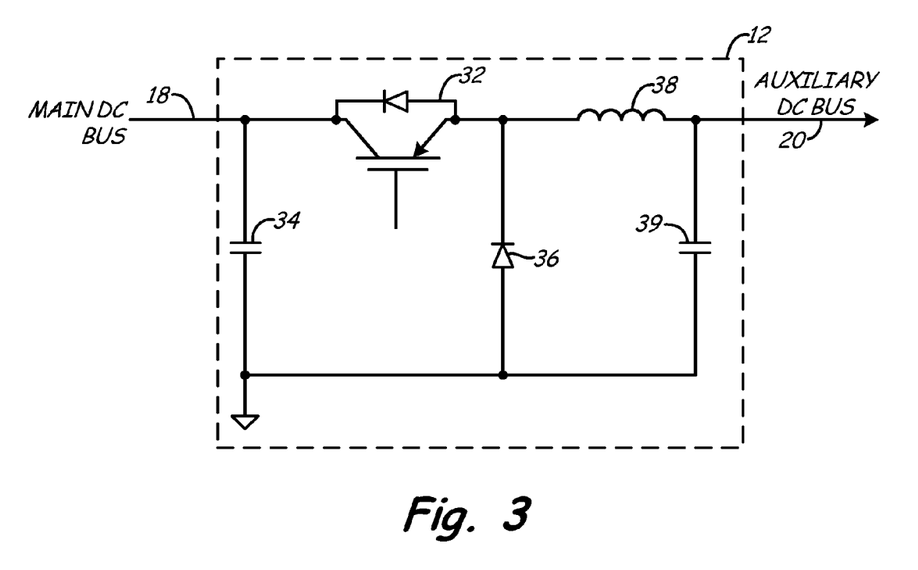
FIG. 3 is a circuit diagram of a DC power converter according to an embodiment of the present invention.

FIG. 3 is a circuit diagram of DC power converter 12 according to an embodiment of the present invention, which includes regulator switch 32, capacitor 34, diode 36, inductor 38, and capacitor 39. In the embodiment shown in FIG. 3, DC power converter 12 and associated components are arranged in a non-isolated step-down (buck) converter topology. In other embodiments, other DC-DC power converter topologies may be employed to provide a regulated DC output on auxiliary DC bus 20 from main DC bus 18.

Regulator switch 32 is connected between main DC bus 18 and auxiliary DC bus 20. PMAD controller 17 controls the state of regulator switch 32 via control signal 22. When regulator switch 32 is turned On, voltage supplied by main DC bus 18 is provided directly to auxiliary DC bus 20, such that auxiliary DC bus 20 is unregulated. By varying the duty ratio of regulator switch 32, the voltage supplied by main DC bus 18 is stepped down to a lower voltage for supply to auxiliary DC bus 20. PMAD system 10 (as shown in FIG. 1) utilizes power converter 12 and the plurality of hybrid SSCBs 14a-14d to implement various modes of operation, normal, pre-charge, overload protection, and current limiting. Each mode of operation is discussed in brief, with FIGS. 4-7 providing additional details on functions performed during each mode of operation. In general, PMAD system 10 operates to provide power to loads 16a-16d via the main switch (e.g., main switch 26 shown in FIG. 2). However, for operations that require regulation of the bus power provided to hybrid SSCBs 14a-14d, then PMAD controller 17 turns off the main switch and turns on the auxiliary switch (e.g., auxiliary switch 28 shown in FIG. 2). PMAD controller 17 then regulates auxiliary DC bus 20 via regulator switch 32 in power converter 12.

Figure 4:
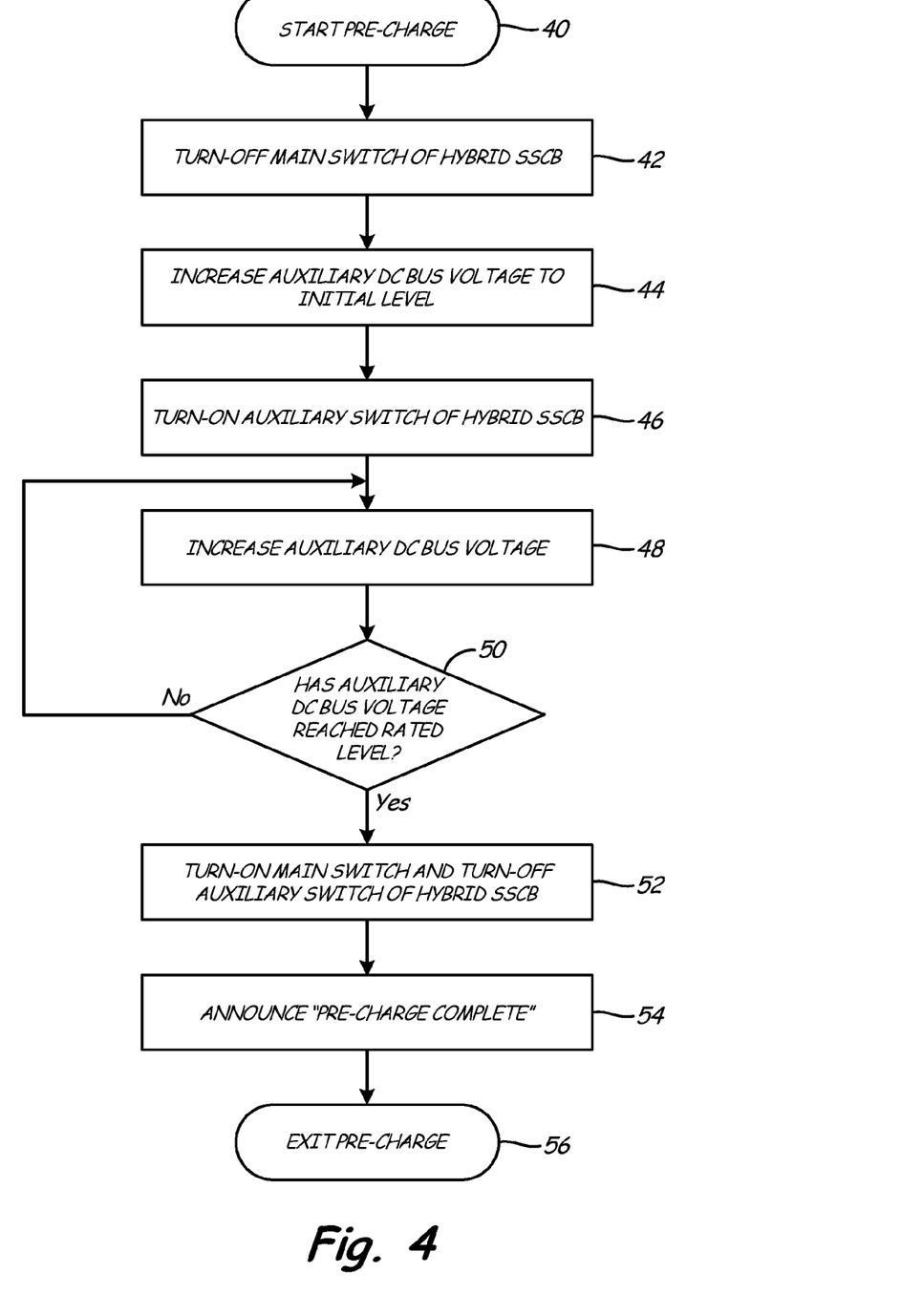
FIG. 4 is a flowchart illustrating functions performed by a PMAD controller to provide pre-charge according to an embodiment of the present invention.

FIG. 4 is a flowchart illustrating functions performed by PMAD controller 17 during a pre-charge operation according to an embodiment of the present invention. The pre-charge mode is used with respect to capacitive loads that may otherwise cause large in-rush currents at start-up. Pre-charge is implemented by utilizing power supplied by auxiliary DC bus 20 to charge the one or more capacitive loads, wherein PMAD controller 17 regulates the voltage on auxiliary DC bus 20 to prevent large in-rush currents. To illustrate, the functions are described with respect to pre-charge of capacitive load 16a.

At step 40, PMAD controller 17 initiates a pre-charge operation. This may be in response to a system start-up signal, or other input. Typically, a pre-charge operation is initiated prior to a normal operating mode.

At step 42, PMAD controller 17 turns Off main switch 26 (shown in FIG. 2) of hybrid SSCB 14a via control signal 24a. Auxiliary switch 28 is Off, and thus no power is supplied to load 16a.

At step 44, PMAD controller 17 regulates the voltage on auxiliary DC bus 20 to an initial level. In the embodiment shown in FIG. 3, PMAD controller 17 modulates control signal 22 to control the duty cycle of regulator switch 32 (shown in FIG. 3) to regulate the output voltage of power converter 12.

At step 46, PMAD controller 17 turns on auxiliary switch 28 via control signal 24a'. As a result, power is supplied to load 16a from auxiliary DC bus 20. By maintaining the voltage provided by power converter 12 to auxiliary DC bus 20 at a relatively low voltage (as described at step 44), the voltage (and therefore in-rush current) supplied to load 16a remains limited and allows pre-charging of capacitor load 16a.

At step 48, PMAD controller 17 increases the voltage on auxiliary DC bus 20 by regulating the voltage supplied by power converter 12. As discussed with respect to FIG. 3, PMAD controller 17 increases the voltage supplied by power converter 12 by increasing the duty cycle of regulator switch 32. In one embodiment, PMAD controller 17 increases the voltage provided by power converter 12 at a pre-determined rate to gradually increase the voltage supplied to the load without creating large in-rush currents.

At step 50, PMAD controller 17 determines whether the voltage on auxiliary DC bus 20 has reached a threshold or rated level. If the voltage on auxiliary DC bus 20 has not reached the threshold level, then the process continues at step 48, with PMAD controller 17 continually increasing the voltage on auxiliary DC bus 20. If the voltage on auxiliary DC bus 20 has reached the threshold level, then at step 52 PMAD controller 17 turns on main switch 26 and turns off the gate of auxiliary switch 28. As a result, power from main DC bus 18 is supplied to load 14a. At step 54, PMAD controller 54 provides a signal or otherwise announces that pre-charge is complete. At step 56, operation in the pre-charge mode is exited.

Figure 5:
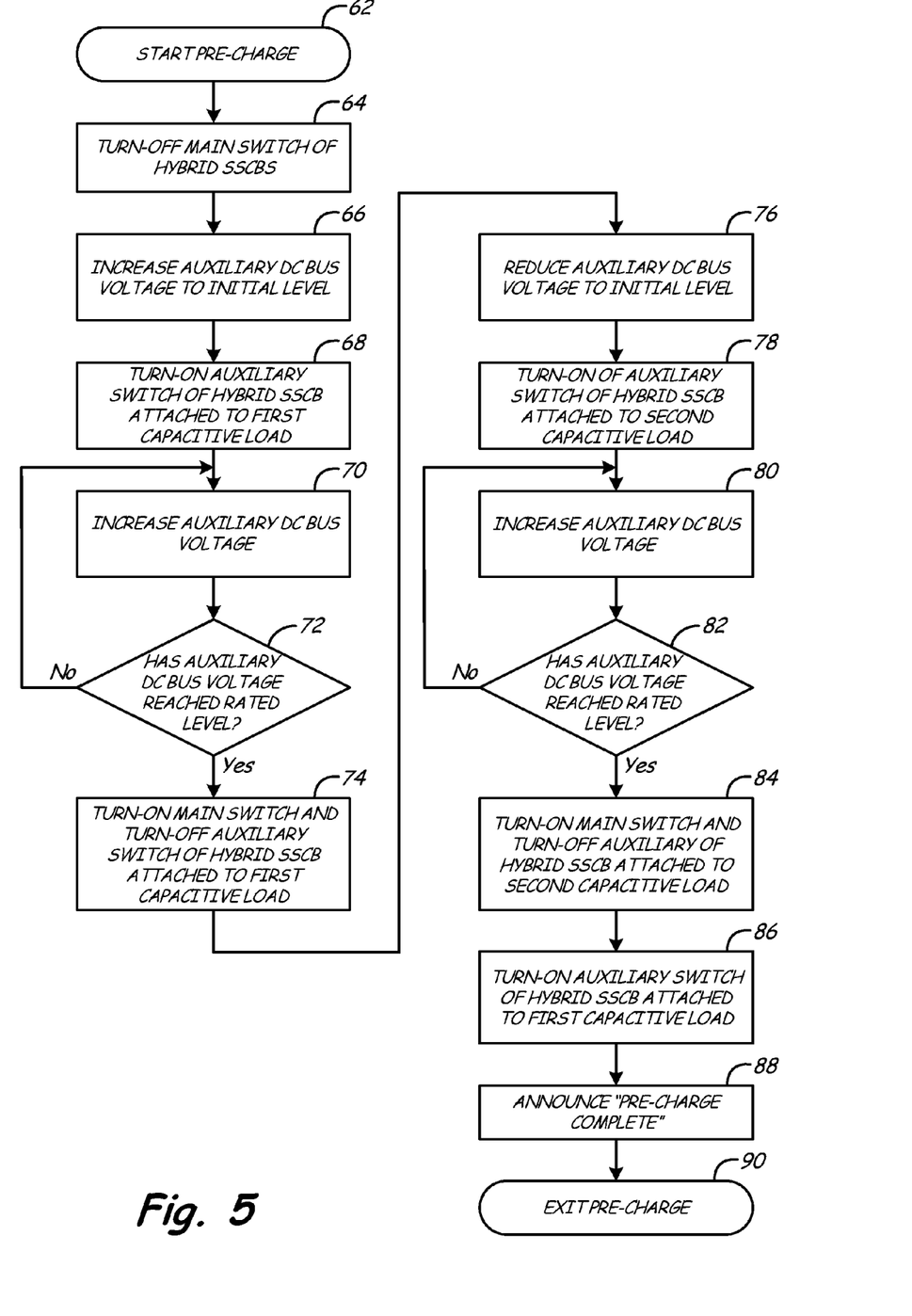
FIG. 5 is a flowchart illustrating functions preferred by a PMAD controller to provide pre-charge according to another embodiment of the present invention.

FIG. 5 is a flowchart illustrating functions performed by PMAD controller 17 during a pre-charge operation of two or more loads according to an embodiment of the present invention. In contrast with the embodiment described with respect to FIG. 4, in the embodiment shown in FIG. 5 two or more capacitive loads are charged via a pre-charge process. To illustrate, the functions are described with respect to pre-charge of respective loads 16a and 16b.

At step 62, PMAD controller 17 initiates a pre-charge operation. This may be in response to a system start-up signal, or other input. At step 64, PMAD controller 17 turns Off the main switch of hybrid SSCBs 14a-14d. For example, if loads 16a and 16b are capacitive loads to be pre-charged, then PMAD controller 17 turns Off the main switches associated with each hybrid SSCB via control signals 24a and 24b. Auxiliary switches associated with hybrid SSCBs 14a and 14b are Off, and thus no power is supplied to the load.

At step 66, PMAD controller 17 regulates the output voltage of power converter 12 to a desired level for provision to auxiliary DC bus 20. In one embodiment, PMAD controller 17 regulates the duty cycle of regulator switch 32 (shown in FIG. 3) to regulate the output voltage of power converter 12.

At step 68, PMAD controller 17 turns on auxiliary switch 28 employed in a first hybrid SSCB associated with a first capacitive load. For example, if load 16a is to be pre-charged first, then PMAD controller 17 turns on auxiliary switch 28 located in hybrid SSCB 14a via control signal 24a', while maintaining other auxiliary SSCBs located in hybrid SSCBs 14b-14d Off. As a result, power is supplied to load 16a from auxiliary DC bus 20 at a voltage determined by the regulated output of by power converter 12, while no power is supplied to loads 16b-16d. By maintaining the voltage provided by power converter 12 at a relatively low voltage (as described at step 66), the voltage (and therefore in-rush current) supplied to load 16a remains limited.

At step 72, PMAD controller 17 increases the voltage on auxiliary DC bus 20 by regulating the voltage supplied by power converter 12. As discussed with respect to FIG. 3, PMAD controller 17 increases the voltage supplied by power converter 12 by increasing the duty cycle of regulator switch 32, controlled via control signal 22. In one embodiment, PMAD controller 17 increases the voltage provided by power converter 12 at a pre-determined rate. As a result, the voltage and current supplied to the load (e.g., load 16a) is increased gradually, thereby eliminating in-rush currents.

At step 74, PMAD controller 17 determines whether the voltage on auxiliary DC bus 20 has reached a threshold or rated level. If the voltage on auxiliary DC bus 20 has not reached the threshold level, then the process continues at step 70 with PMAD controller 17 increasing the voltage on auxiliary DC bus 20. If the voltage on auxiliary DC bus 20 has reached the threshold level, then at step 74 PMAD controller 17 turns On main switch 26 and turns Off the gate of auxiliary switch 28 of the hybrid SSCB (e.g., hybrid SSCB 14a) associated with the first capacitive load (e.g., load 16a). As a result, power is supplied to the first capacitive load from main DC bus 18.

At step 76, with the first capacitive load fully On and receiving power from main DC bus 18, PMAD controller begins the process for turning On the next or second capacitive load (e.g., load 16b). At step 76, PMAD controller 17 reduces the voltage on auxiliary DC bus 18 to the initial level discussed with respect to step 66. Once again, PMAD controller 17 regulates the voltage on auxiliary DC bus 18 via power converter 12.

At step 78, PMAD controller 17 turns On the auxiliary switch (not shown) of hybrid SSCB 14b via control signal 24b'. In this way, the second capacitive load begins receiving power from auxiliary DC bus 20, but in-rush currents are prevented because the voltage on auxiliary DC bus 20 is regulated to a relatively low level.

At step 80, PMAD controller 17 increases the voltage on auxiliary DC bus 20. In one embodiment, PMAD controller 17 increases the voltage at a pre-determined rate by regulating the output of power converter 12.

At step 82, PMAD controller 17 determines whether the voltage on auxiliary DC bus 20 has reached a threshold or rated level. If the voltage on auxiliary DC bus 20 has not reached the threshold level, then the process continues at step 80 with PMAD controller 17 increasing the voltage on auxiliary DC bus 20. If the voltage on auxiliary DC bus 20 has reached the threshold level, then at step 84 PMAD controller 17 turns On the main switch and turns Off the auxiliary switch (not shown) of hybrid SSCB 14b associated with second capacitive load 16b. As a result, power is supplied to the second capacitive load 16b from main DC bus 18.

At step 86, PMAD controller 17 turns On the auxiliary switch 28 associated with the first hybrid SSCB 14a and maintains in the On state the auxiliary switch associated with second hybrid SSCB 14b. In this way, the auxiliary switches associated with each hybrid SSCB, as well as the main switches, are turned On as PMAD controller 17 transitions from pre-charge mode to normal mode.

At step 88, PMAD controller 17 announces that pre-charge is complete, and at step 90 exits the pre-charge mode. In this way, PMAD controller provides sequential pre-charge of each capacitive load, thereby avoiding in-rush currents for each capacitive load.

Figure 6:
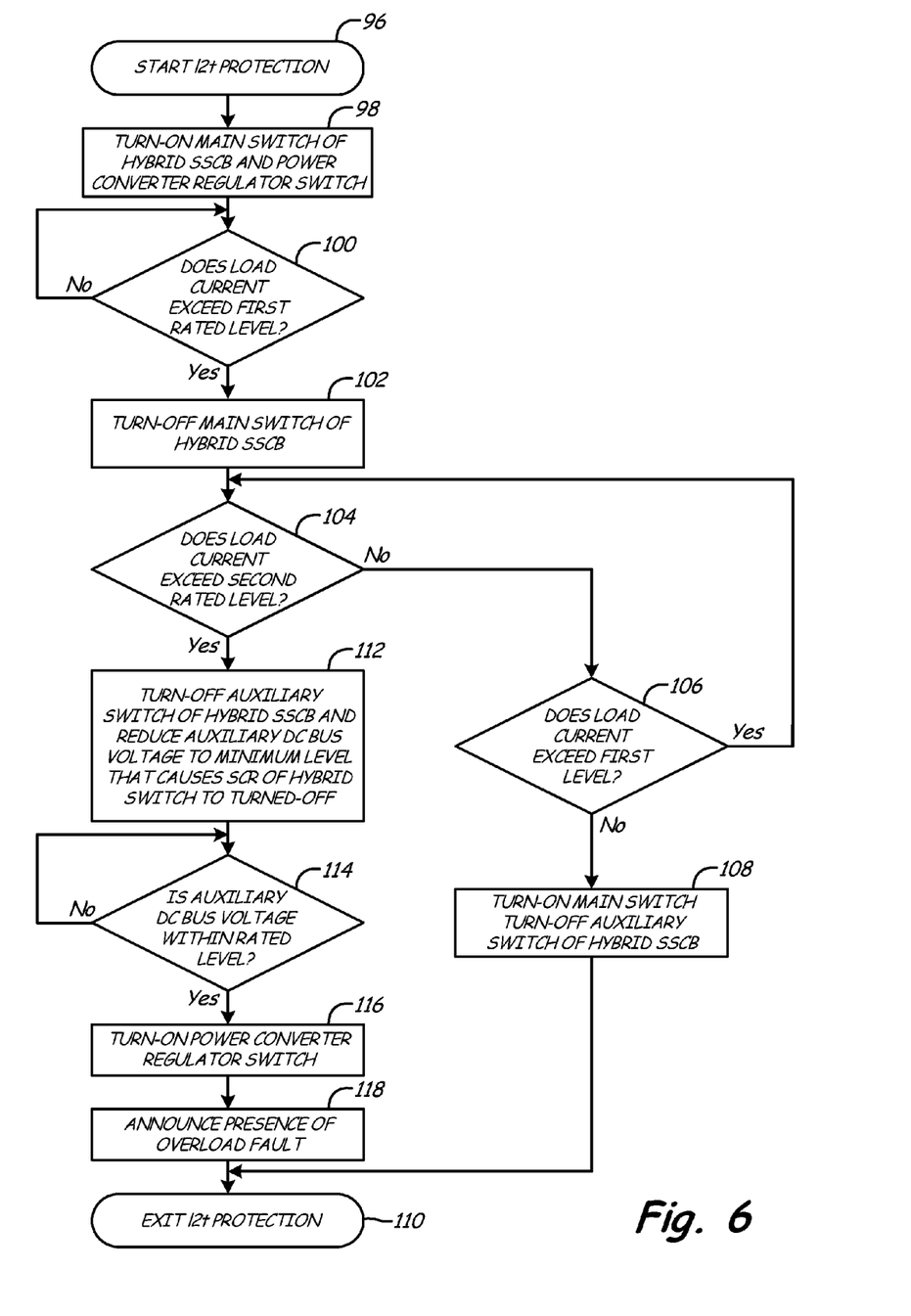
FIG. 6 is a flowchart illustrating functions performed by a PMAD controller to provide overload protection according to an embodiment of the present invention.

FIG. 6 is a flowchart illustrating functions performed by PMAD controller 17 to initiate and provide overload protection according to an embodiment of the present invention. To illustrate, the functions are described with respect to an overload condition detected with respect to hybrid SSCB 14a and respective load 16a. In general, with a detected overload condition, PMAD controller 17 routes power through the auxiliary switch of the hybrid SSCB, wherein the auxiliary switch is capable of handling higher currents. If the overload condition persists, then the auxiliary switch is turned Off and auxiliary DC bus 20 is de-energized (i.e., voltage is reduced).

Overload protection is initiated at step 96. This does not mean that PMAD controller 17 enters an overload protection mode, only that PMAD controller 17 is beginning the process of monitoring for overload conditions. In one embodiment, overload protection may be initiated when PMAD controller 17 exits the pre-charge mode and begins normal operating mode.

At step 98, PMAD controller 17 turns On main switch 26 of hybrid SSCB 14a. If main switch 26 is already On, then PMAD controller 17 maintains main switch 26 in an On state. In addition, PMAD controller 17 turns on regulator switch 32 associated with power converter 12 to provide an unregulated DC output to auxiliary DC bus 20. This represents the "normal" operating mode for PMAD system 10.

At step 100, PMAD controller 17 determines whether the load current exceeds a rated level. In one embodiment, PMAD controller 17 compares the monitored load current to a trip threshold. In another embodiment PMAD controller 17 utilizes a trip curve to determine the presence of an overload condition. If the monitored current does not exceed a rated level, then monitoring continues at step 100. If the monitored current does exceed a rated level, then PMAD controller 17 initiates overload protection mode at step 102.

At step 102, in response to the monitored current exceeding the rated level, PMAD controller 17 turns off main switch 26 within hybrid SSCB 14a to prevent power from main DC bus 18 being supplied to load 16a. Auxiliary switch 28 remains On, and power is supplied to load 16a from auxiliary DC bus 20. In one embodiment, auxiliary DC bus 20 is unregulated at this point, and therefore provides a voltage very similar to the voltage supplied by main DC bus 18.

At step 104, PMAD controller 17 determines whether the load current exceeds a second rated ($I^2t$ trip curve) threshold value. If at step 104, PMAD controller 17 determines that the second rated threshold (or trip curve) has not been exceeded, then at step 106 PMAD controller 17 determines whether the monitored load current still exceeds the first rated threshold value utilized at step 100. If the monitored current does exceed the first rated threshold value, then PMAD controller 17 continue monitoring the current and comparing it to the second rated threshold value at step 104. If the monitored current no longer exceeds the first rated threshold value, then at step 108 PMAD controller 17 turns On main switch 26 to supply power to load 16a from main DC bus 18. In addition, PMAD controller 17 may turn Off auxiliary switch 28, although in other embodiments auxiliary switch 28 may remain On, with a majority of the current being supplied from main DC bus 18 via main switch 26. At step 110, with the monitored current now below both the first rated threshold and the second rated threshold, the overload protection mode is exited and the normal operating mode continues.

If at step 104, PMAD controller 17 determines that the monitored current exceeds the second rated (I^2t) threshold, then at step 112 PMAD controller 17 turns Off the gate of auxiliary switch 28. To prevent power from being supplied to the load from either main DC bus 18 or auxiliary DC bus 20, both main and auxiliary switches must be turn-off. When implemented as a thyristor, auxiliary switch 28 can only be turn off by reducing anode to cathode voltage so the current falls below the minimum holding current level. Thus, PMAD controller 17 reduces the voltage on auxiliary DC bus 20 to a minimum level (via power converter 12).

At step 114, PMAD controller 17 determines whether the load current falls below a third rated threshold level. The third rated threshold level employed at step 114 is less than the holding current level of the thyristor (i.e., SCR). If the current has not decreased below the third rated threshold level, then the process continues at step 112 with PMAD controller 17 maintaining the gate of auxiliary switch 28 in the Off position and reducing the auxiliary DC bus voltage 20 to a minimum level.

If at step 114 the monitored load current does fall below the third rated threshold level, this indicates that the power has been successfully disconnected from the faulty load. At step 116, PMAD controller 17 turns on power converter 12 to supply power to auxiliary DC bus 20. At step 118, PMAD controller 17 announces the presence of an overload fault with respect to the faulty load, and exits the overload protection mode at step 110.

Figure 7:
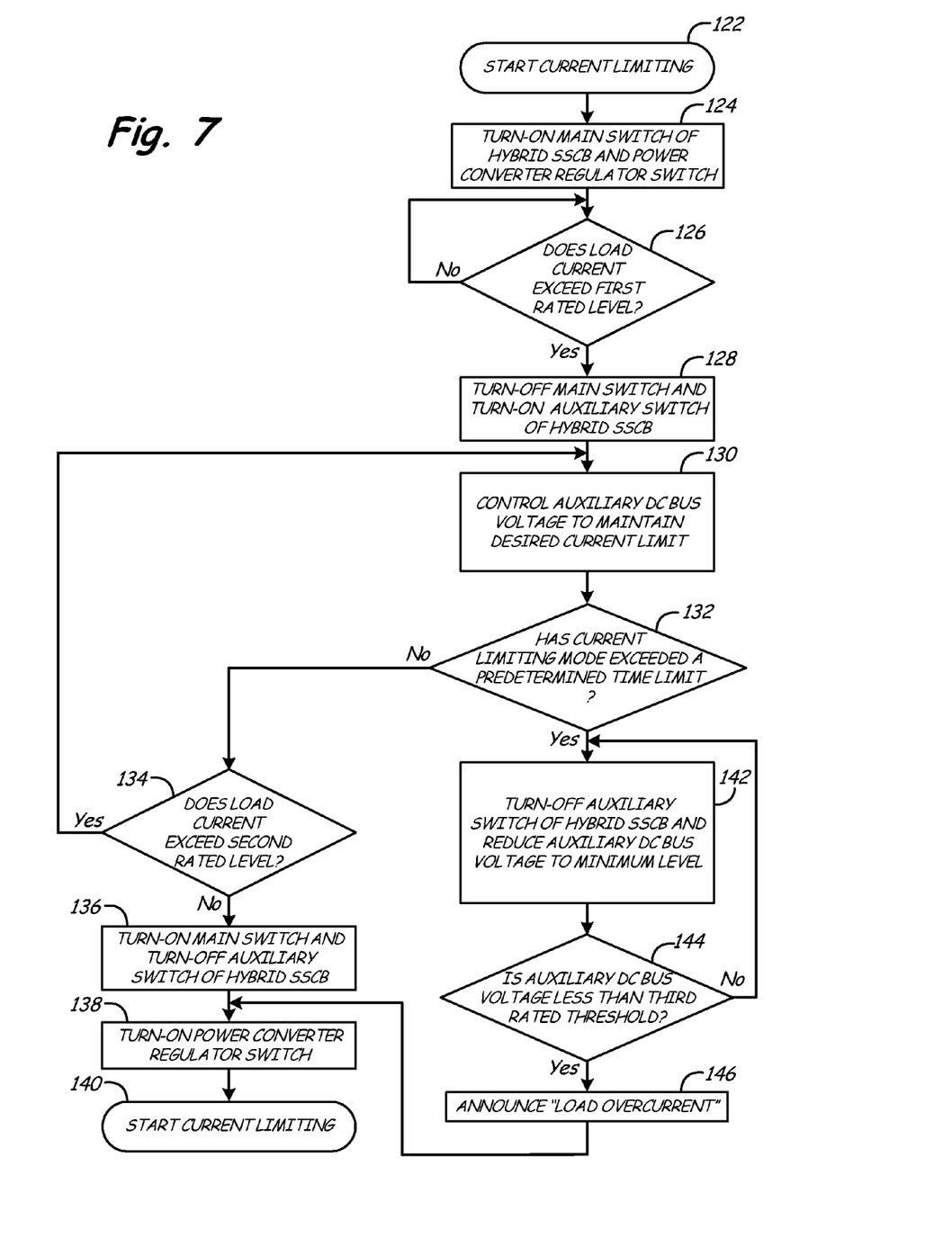
FIG. 7 is a flowchart illustrating functions performed by a PMAD controller to provide current limiting according to an embodiment of the present invention.

FIG. 7 is a flowchart illustrating functions performed by PMAD controller 17 to provide current limiting according to an embodiment of the present invention. To illustrate, the functions are described with respect to an overload condition detected with respect to hybrid SSCB 14a and respective load 16a. In general, current limiting is provided in response to an overcurrent condition, in which PMAD controller 17 turns Off the main switch and limits the current by limiting the voltage made available on auxiliary DC bus 20.

Current limiting mode of operation is enabled at step 122, although current limiting will not be initiated unless a faulty load is detected. Once again, operation is discussed with respect to hybrid SSCB 14a and corresponding load 16a. At step 124, PMAD controller 17 turns On main switch 26. In addition, PMAD controller 17 turns On regulator switch 32 associated with power converter 12, if not already On, to supply power to auxiliary DC bus 20.

At step 126, PMAD controller 17 determines whether the load current exceeds a first rated threshold, which may be the same or different than the rated threshold level employed in the overload protection mode of operation. If the monitored load current does not exceed the first rated threshold, then PMAD controller 17 continues monitoring the load current at step 126. If the monitored load current does exceed the rated threshold level, then at step 128 PMAD controller 17 turns Off main switch 26 and turns On (if not already On) auxiliary switch 28. In this way, power is supplied to load 16a from auxiliary DC bus 20.

At step 130, PMAD controller 17 regulates the voltage on auxiliary DC bus 20 via power converter 12 to maintain a desired current through auxiliary switch 28. PMAD controller 17 selectively increases or decreases the voltage supplied by power converter 12 to regulate the current monitored through auxiliary switch 28.

At step 132, PMAD controller 17 determines whether the period of operation of the current limiting mode has exceeded a predetermined time limit. If the predetermined time limit has not been exceeded, then PMAD controller 17 determines at step 134 whether the load current exceeds a second rated threshold. In one embodiment, the second rated threshold is the same as the first rated threshold employed at step 126, although in other embodiments different thresholds could be employed. If the second rated threshold is still exceeded, then the process continues at step 130 with PMAD controller 17 regulating the current through auxiliary switch 28 via current regulator 12.

If the second rated threshold level has been exceeded, then at step 136 PMAD controller 17 turns On main switch 26 and turns Off the gate of auxiliary switch 28 to supply power to load 16a from main DC bus 18. That is, PMAD controller 17 determines that the load fault has cleared and normal operation can resume.

At step 138, PMAD controller 17 increases the voltage supplied by power converter 12 to auxiliary DC bus 20. In one embodiment, controller 17 turns On regulator switch 32 to provide an unregulated DC output to auxiliary DC bus 20. At step 140, PMAD controller exits the current limiting mode.

If at step 132, the pre-determined time limit threshold is exceeded, then at step 142 PMAD controller 17 turns Off auxiliary switch 28. In addition, PMAD controller 17 reduces the voltage supplied by power converter 12 to auxiliary DC bus 20 to allow the current through auxiliary switch 28 to fall below the holding current (if implemented with an thyristor), resulting in auxiliary switch 28 turning off and disconnecting power to the faulty load 16a.

At step 144, PMAD controller 17 determines whether the monitored load current has fallen below a third threshold level below the holding current level of auxiliary switch 28, when implemented as a thyristor). If the monitored load current has not decreased below the third threshold, then at step 142 PMAD controller 17 continues maintaining auxiliary switch 28 in the Off state and reducing the voltage made available on auxiliary DC bus 20 to allow current through auxiliary switch 28 to fall below the holding current level, resulting in auxiliary switch 28 (when implemented as an SCR) turning Off and disconnecting power to the faulty load 16a.

If the monitored current is less than the third rated threshold, then an overcurrent condition is announced at step 146. Main switch 26 and auxiliary switch 28 remain Off to isolate faulty load 16a, but at step 138 PMAD controller 17 controls power converter 12 to supply power once again to auxiliary DC bus 20. At step 140 the current limiting mode is exited.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power management and distribution (PMAD) system comprising:
    a main direct current (DC) bus;
    an auxiliary DC bus;
    a controller;
    a power converter connected between the main DC bus and the auxiliary DC bus, the power converter comprising:
        a regulator switch that includes a regulator control terminal connected to the controller, wherein the controller is configured to control the regulator switch to control power from the main DC bus to the auxiliary DC bus;
    one or more hybrid solid-state circuit breakers (SSCBs) configured to receive power from the main DC bus as a first input and power from the auxiliary DC bus as a second input and provide a circuit breaker output to at least one load, each of the one or more hybrid SSCBs comprising:
        a main switch connected between the first input and the circuit breaker output that includes a main switch control terminal connected to the controller, wherein the controller is configured to control the main switch On to provide power from the main DC bus to the at least one load and Off to prevent distribution of power from the main DC bus to the at least one load; and
        an auxiliary switch connected between the second input and the circuit breaker output that includes an auxiliary switch control terminal connected to the controller, wherein the auxiliary switch is controlled by the controller to control the main switch On to provide power from the auxiliary bus to the at least one load and Off to prevent distribution of power from the auxiliary bus to the at least one load.

2. The (PMAD) system of claim 1, wherein during a pre-charge operation the controller turns Off the main switch, controls the regulator switch to regulate a converter voltage provided by the power converter to an initial voltage less than a main voltage on the main DC bus, and turns On the auxiliary switch.

3. The PMAD system of claim 2, wherein the controller controls the regulator switch to gradually increases the converter voltage and turns On the main switch when the converter voltage reaches a threshold level.

4. The PMAD system of claim 1, wherein during an overload operation the controller monitors current supplied to the at least one load, turns Off the main switch and turns On the auxiliary switch in response to the monitored current exceeding a first rated threshold.

5. The PMAD system of claim 4, wherein if the monitored current exceeds a second rated threshold while the auxiliary switch is On, the controller turns Off the auxiliary switch and controls the regulator switch to reduce a converter voltage supplied by the power converter to a minimum level, and wherein if the monitored current falls below the first rated threshold, the controller turns On the main switch.

6. The PMAD system of claim 5, wherein if the monitored current falls below a third rated threshold while the main switch and auxiliary switch are Off, then the controller controls the regulator switch to increases the converter voltage.

7. The PMAD system of claim 1, wherein during a current limiting operation the controller monitors current supplied to the at least one load, turns Off the main switch and turns On the auxiliary switch in response to the monitored current exceeding a first rated threshold, and controls the regulator switch to regulate a voltage supplied by the power converter based on the monitored current.

8. A controller that manages the distribution of power to one or more loads via a hybrid solid-state circuit breaker (SSCB) having at least a main switch connected between a first input and a circuit breaker output, and an auxiliary switch connected between a second input and a circuit breaker output, wherein a main direct current (DC) bus is connected to the first input, an auxiliary DC bus is connected to the second input and the circuit breaker output is connected to at least one load, and wherein a power converter that includes a regulator switch receives power from the main DC bus and provides a regulated output to the auxiliary DC bus, the controller configured for:
    providing a first control signal connected to a first control terminal of the main switch to control the state of the main switch, wherein the main switch distributes power from the main DC bus to the circuit breaker output when On and prevents the distribution of power from the main DC bus to the circuit breaker output when Off;
    providing a second control signal connected to a second control terminal of the auxiliary switch to control the state of the auxiliary switch, wherein the auxiliary switch distributes power from the auxiliary DC bus to the circuit breaker output when On and prevents the distribution of power from the auxiliary DC bus to the circuit breaker output when off; and
    providing a third control signal connected to a third control terminal of the regulator switch to control a state of the regulator switch to regulate output voltage provided by the power converter to the auxiliary DC bus.

9. The controller of claim 8, wherein the controller pre-charges capacitive loads by turning Off the main switch via the first control signal, regulating the auxiliary DC bus to an initial level via the third control signal, and turning On the auxiliary switch to supply power to the load via the auxiliary DC bus.

10. The controller of claim 9, wherein the controller gradually increases the voltage on the auxiliary DC bus via the third control signal, and turns On the main switch and turns Off the auxiliary switch when the voltage on the auxiliary DC bus reaches a threshold level.

11. The controller of claim 9, wherein the controller provides overload protection by turning Off the main switch and turning On the auxiliary switch in response to a monitored current exceeding a first rated threshold.

12. The controller of claim 11, wherein the controller turns Off the auxiliary switch if the monitored current exceeds a second rated threshold, and decreases voltage on the auxiliary DC bus, wherein the second rated threshold is higher than the first rated threshold.

13. The controller of claim 12, wherein the controller turns On the main switch and turns Off the auxiliary switch if the monitored current decreases below the first rated threshold.

14. The controller of claim 9, wherein the controller provides current limiting by turning Off the main switch and turning On the auxiliary switch in response to a monitored current exceeding a first rated threshold value, wherein the controller regulates the voltage on the auxiliary DC bus based on the monitored current.

15. The controller of claim 14, wherein the controller reduces the voltage on the auxiliary DC bus to a minimum level if the monitored current exceeds the first rated threshold value for a pre-determined period of time.

* * * * *